US008849216B2

(12) United States Patent
Baligh et al.

(10) Patent No.: US 8,849,216 B2
(45) Date of Patent: Sep. 30, 2014

(54) SYSTEM AND METHOD FOR ADJUSTING DOWNLINK CHANNEL QUALITY INDEX IN A WIRELESS COMMUNICATIONS SYSTEM

(75) Inventors: Mohammadhadi Baligh, Kanata (CA); Aaron Callard, Ottawa (CA); Jianglei Ma, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 600 days.

(21) Appl. No.: 12/831,050

(22) Filed: Jul. 6, 2010

(65) Prior Publication Data

US 2011/0014926 A1 Jan. 20, 2011

Related U.S. Application Data (60) Provisional application No. 61/226,209, filed on Jul. 16, 2009.

(51) Int. Cl.
H04B 7/00 (2006.01)
H04L 1/00 (2006.01)
(52) U.S. Cl.
CPC .................... H04L 1/0026 (2013.01)
USPC ........... 455/69; 455/67.11; 370/252; 370/329
(58) Field of Classification Search
CPC ............................. H04W 72/08; H04W 24/10
USPC ................. 455/418, 419, 420, 423, 430, 434, 455/452.2, 522, 13.4, 69, 127.5, 504, 506; 370/252, 318, 332, 333, 335, 465, 468, 370/320
See application file for complete search history.

(56) References Cited

U.S. PATENT DOCUMENTS

| | | | |
|---|---|---|---|
| 2003/0109221 A1* | 6/2003 | You et al. ..................... | 455/13.4 |
| 2005/0181799 A1* | 8/2005 | Laroia et al. .................. | 455/450 |
| 2005/0181811 A1* | 8/2005 | Magnusson et al. .......... | 455/458 |
| 2006/0246937 A1* | 11/2006 | Lindoff ......................... | 455/522 |
| 2007/0047502 A1* | 3/2007 | Marinier et al. ............... | 370/335 |
| 2007/0238480 A1* | 10/2007 | Lin et al. ....................... | 455/522 |
| 2008/0233967 A1* | 9/2008 | Montojo et al. ........... | 455/452.2 |

FOREIGN PATENT DOCUMENTS

| | | |
|---|---|---|
| CN | 1533105 A | 9/2004 |
| CN | 101449483 A | 6/2009 |
| WO | WO 2009/044685 A1 | 4/2009 |

OTHER PUBLICATIONS

"3rd Generation Partnership Project; Technical Specification Group Radio Access Network; Evolved Universal Terrestrial Radio Access (E-UTRA); Multiplexing and channel coding (Release 8)," Technical Specification, Sep. 2008, 56 pages, 3GPP TS 36.212 V8.4.0.

(Continued)

*Primary Examiner* — Lester Kincaid
*Assistant Examiner* — Dung Lam
(74) *Attorney, Agent, or Firm* — Slater & Matsil, L.L.P.

(57) ABSTRACT

In accordance with an embodiment, a method of operating a controller in a wireless communication system includes receiving channel feedback information from a communications node, adjusting the channel feedback information based on a measurement of interference from neighboring controllers, adjusting transmit parameters of the controller using the adjusted channel feedback information, and transmitting to the communications node using the adjusted transmit parameters.

13 Claims, 4 Drawing Sheets

(56) References Cited

OTHER PUBLICATIONS

"3rd Generation Parntership Project; Technical Specification Group Radio Access Network; Evolved Universal Terrestrial Radio Access (E-UTRA); Physical layer procedures (Release 8)," Technical Specification, Sep. 2008, 60 pages, 3GPP TS 36.213 V8.4.0.

"3rd Generation Partnership Project, Technical Specification Group Radio Access Network; Evolved Universal Terrestrial Radio Access (E-UTRA); Physical Channels and Modulation (Release 8)," Technical Specification, Sep. 2008, 78 pages, 3GPP TS 36.211 V8.4.0.

International Search Report and Written Opinion of the Patent Cooperation Treaty received in International Application No. PCT/CN2010/075136 mailed Oct. 28, 2010, 9 pages.

IEEE Standard for Information technology—Telecommunications and information exchange between systems—Local and metropolitan area networks—Specific requirements Part 11: Wireless LAN Medium Access Control (MAC) and Physical Layer (PHY) Specifications, IEEE Std 802.11™—2007, (Revision of IEEE Std 802.11-1999), 1232 pages.

\* cited by examiner

SYSTEM AND METHOD FOR ADJUSTING DOWNLINK CHANNEL QUALITY INDEX IN A WIRELESS COMMUNICATIONS SYSTEM

CROSS REFERENCE TO RELATED APPLICATIONS

This patent application claims priority to U.S. Provisional Application No. 61/226,209 filed on Jul. 16, 2009, entitled "System and Method for Adjusting Downlink Channel Quality Index in a Wireless Communications System," which application is hereby incorporated by reference herein.

TECHNICAL FIELD

The present invention relates generally to wireless communications, and more particularly to a system and method for adjusting downlink (DL) channel quality index (CQI) in a wireless communications system.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

In a fully utilized OFDMA or multiple input, multiple output (MIMO) OFDMA wireless communications system without power control, base stations occupy the entire band with a nominal transmit power. Base stations may also be referred to as enhanced Node Bs (eNBs) controllers, base terminal stations, and the like. Such base stations transmit to and receive transmissions from user devices. User devices may also be referred to as user equipment (UE) mobile stations, terminals, access terminals, communications devices, and so forth.

In some systems, such as LTE, a base station generally does not have information about the short term fading information of the interference from other base stations, the channel resource utilization and precoder matrices used by other base stations. Therefore, the base station may not be aware of the interference spectrum received by the user devices it serves.

Some systems have addressed this issue by making a base station know the power spectrum masks from neighboring base stations. Here, a base station can better estimate the interference spectrum at each user device and perform a better scheduling and modulation and coding scheme (MCS) adaptation. One example of this is a system where fractional frequency reuse power control is applied and other base stations are aware of the base station power mask spectrum, for example, through backhauling or system planning Another example is a system where base stations are made aware of spectrum underutilization resulting from non-fully loaded base stations. Once a base station is aware of spectrum underutilization of its neighboring base stations, the base station can improve its scheduling, modulation, and coding scheme (MCS) adaptation. In both examples, the base station may be made aware of the underutilized power spectrum through pre-planned deployment power masks or through relative narrowband transmit power (RNTP) signaling between base stations.

In some systems, such as Long Term Evolution (LTE) systems, the base station gathers information about the downlink channel by polling receiving channel quality index information (CQI) from user devices on the network. In practical applications, however, the CQI reported by the user device may be higher or lower than the actual channel quality index. Because of this, an LTE base station adaptively adjusts the CQI reported by the user device by monitoring acknowledge (ACK) and non-acknowledge (NACK) signals from the user device. Such adaptation, however, takes time. During this adaptation time, the user device may be dropping packets because the base station is transmitting using an MCS level that is too high for the actual channel, or the user device may be operating at a slower data rate because the base station is transmitting using an MCS level that it too low for the actual channel. In either case, the performance of the user device is suboptimal during the adaptation time.

SUMMARY OF THE INVENTION

In accordance with an embodiment, a method of operating a controller in a wireless communication system includes receiving channel feedback information from a communications node, adjusting the channel feedback information based on a measurement of interference from neighboring controllers, obtaining information of a transmit power mask and channel resource utilization of the neighboring controllers that cause interference to cell edge users, adjusting transmit parameters of the controller using the adjusted channel feedback information, and transmitting to the communications node using the adjusted transmit parameters.

In accordance with a further embodiment, a method of operating a base station includes receiving channel feedback information from a communications device, adjusting the channel feedback information based on a measurement of interference from neighboring base stations, and adjusting a transmitter of the base station using the adjusted channel feedback information; and transmitting to the communications device using the adjusted transmitter. In an embodiment, adjusting includes comparing a power assigned for a resource block with a power assigned for the communications device, and adjusting the channel feedback information based on a result of the comparing.

In accordance with a further embodiment, a base station includes a receiver receiving channel feedback information from a communications device, a transmitter transmitting to the communications device using transmission characteristics based on adjusted feedback information, and a processor adjusting the channel feedback information based on a measurement of interference from neighboring base stations. In an embodiment, adjusting includes comparing a power assigned for a resource block with a power assigned for the communications device, adjusting the channel feedback information based on a result of the comparing, determining the transmission characteristics.

The foregoing has outlined rather broadly the features of some embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, a system and method adjusting downlink channel quality index in a wireless communications system. Embodiments of the invention may also be applied to other types of communications systems and networks.

Figure 1:
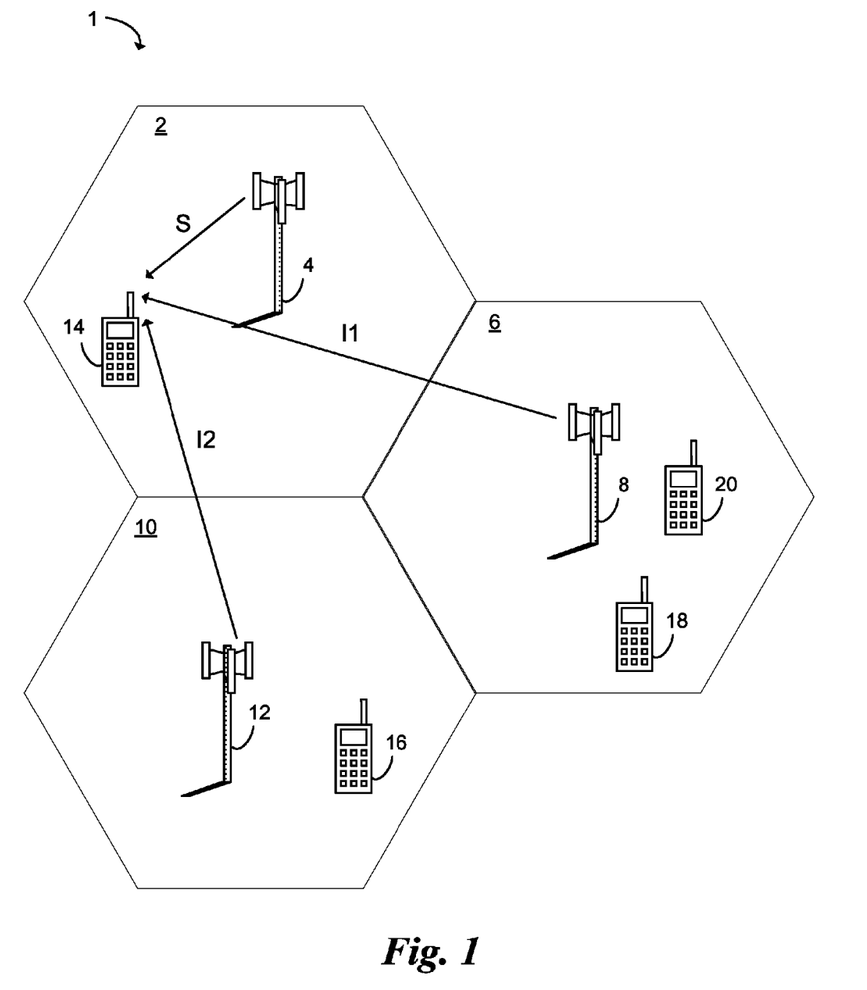
FIG. 1 illustrates an embodiment wireless communication system.

An illustration of an embodiment mobile broadband system 1 is shown in FIG. 1. Mobile broadband system 1 is divided into cells 2, 6 and 10 having corresponding base stations or eNBs 4, 8 and 12, respectively. Mobile terminals or user equipment (UE) 14, 16, 18 and 20 access system 1 through base stations 2, 6 and 10. Three base stations 4, 8, and 12 and four UEs 14, 16, 18 and 20 are used for simplicity of illustration, however, multiple cells and UEs can be used and provided for in real systems. In an embodiment, UE 14 is assigned to cell 2, and receives signal S from base station 4. UE 14 also receives interfering signals I1 and I2 from base stations 8 and 12, respectively. Signals S, I1 and I2 vary according to multipath conditions. In an embodiment, base station 4 adjusts transmission characteristics, including power S according to channel quality conditions reported by UE 14.

Figure 2:
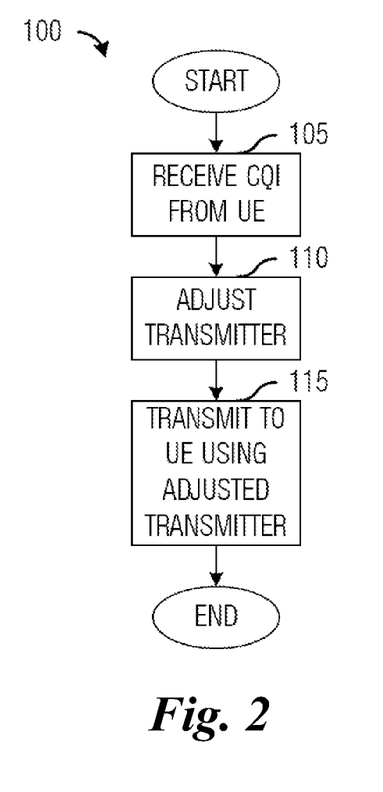
FIG. 2 illustrates a flow diagram according to an embodiment.

FIG. 2 illustrates flow diagram 100 that shows the general operation of an embodiment eNB making use of a reported CQI. First, the eNB receives a CQI report from a UE (block 105). Next, the eNB adjusts its transmitter based on the received CQI (block 110). In an embodiment, adjusting the transmitter includes adjusting transmit parameters. Finally, the eNB uses the reported CQI to schedule transmissions, adjust its MCS adaptation, change its precoding matrix, and so forth. The eNB transmits to the UE using the adjusted transmitter (block 115). In an embodiment of the present invention, the eNB adjusts the transmitter to quickly adapt to channel conditions by using, for example, interference measurements from neighboring base stations, signal power adjustments, path loss from neighboring base stations, and/or power setting planning of neighboring base stations to adjust the CQI received from the UE.

In some systems, because the eNB has no information about the short term fading of the interference at the UE, the eNB uses long-term values captured as reference sequence received power (RSRP) in some embodiments. The long-term values are measured over a number of frames. In an embodiment, RSRP is a measure of the path-loss from neighboring eNBs to the UE. If there is no fractional frequency reuse (FFR) or is there is no unoccupied resource blocks (RBs) in the neighboring eNBs, the wideband interference is expressed as:

$$Interf_{noFFR} = N_0 + \sum_i PL_i^{-1} \overline{P}_i,$$

where $PL_i$ is the long term channel path loss to the UE from the $i^{th}$ interferer and $\overline{P}_i$ is the average power over the band from that interferer. Here, the effect of short term fading and precoding neglected for simplicity. Based on the LTE Rel.8 technical standards, this is the interference measured by the UE to report the CQI, whether there is FFR or not. The adjusted interference power at each RB is expressible as:

$$Interf_{FFR}(RB) = N_0 + \sum_i PL_i^{-1} P_i(RB),$$

where $P_i(RB)$ is the actual power transmitted over the RB.

In an embodiment, the UE may receive a different power from what is assigned to it if its assigned modulation is quadrature phase-shift keying (QPSK) with rank one (1). In some embodiments, this includes rank (1) transmit diversity schemes such as Space Frequency Block Coding (SFBC) as specified in LTE Rel.8. It is also the case that the UE may receive a different power from the assigned power with respect to QPSK of higher rank if successive interference cancellation (SIC) is not used. For simplicity, a user is defined as a QPSK user if this condition is satisfied and the user is able to receive data with a power different than it expects. Furthermore, it is also the case that the UE may receive a different power from the assigned power for any other Phase Shift Keying (PSK) scheme. Therefore, the discussion regarding QPSK, does not limit the scope or the spirit of the embodiments. In one embodiment, the transmit power for a non-QPSK user is not dynamically changed because channel estimation for demodulation is based on common pilots and the DL power control signaling is a slow high layer signaling. If the user specific demodulation pilot is applied, then the transmit power can be changed dynamically for all users which are based on user specific demodulation pilots.

In this situation, where the power is different from the assigned value, the adjusted signal-to-noise ratio (SNR) is expressible as:

$$CQI_{adj\_QPSK} = \frac{\text{Signal\_Adj}}{\text{Interf\_Adj}} CQI_{feedback} \quad (1)$$
$$= \frac{P_s(RB)/P_s(UE)}{Interf_{FFR}(RB)/Interf_{noFFR}} CQI_{feedback},$$

where $CQI_{feedback}$ is the channel feedback information, Signal_Adj is the adjustment due to signal power adjustments, Interf_Adj is the adjustment due to interference, $P_s(RB)$ is the power assigned to the resource block, $P_s(UE)$ is the power assigned to the communications device, $Interf_{FFR}(RB)$ is the wideband interference at the resource block when fractional frequency reuse is used, and $Interf_{noFFR}$ is the wideband interference when fractional frequency reuse is not used. In an embodiment, $P_S(RB)$ is the same as $P_S(\text{Assigned})$ for non-QPSK users and some QPSK users that receive the same power as assigned as defined above. Therefore, the CQI adjustment for such users includes only the interference, as shown below:

$$CQI_{adj\_nonQPSK} = \frac{1}{\text{Interf\_Adj}} CQI_{feedback} \quad (2)$$
$$= \frac{1}{Interf_{FFR}(RB)/Interf_{noFFR}} CQI_{feedback}.$$

In an embodiment, it is assumed that each UE is scheduled in its own power region resulting in some scheduling restrictions. However, some flexibility is still possible in some embodiments. Non-QPSK users with low assigned power may be scheduled in a higher power zone. This may result in an under-utilization of the serving eNB, but it will produce less interference to the neighboring eNBs. If non-QPSK high power users are scheduled in low power regions, interference to neighboring cells may increase. Moreover, the transmitted power may exceed a maximum allowed transmit power. Therefore, in some embodiments, scheduling non-QPSK high power users with lower power assignments is avoided.

Figure 3:
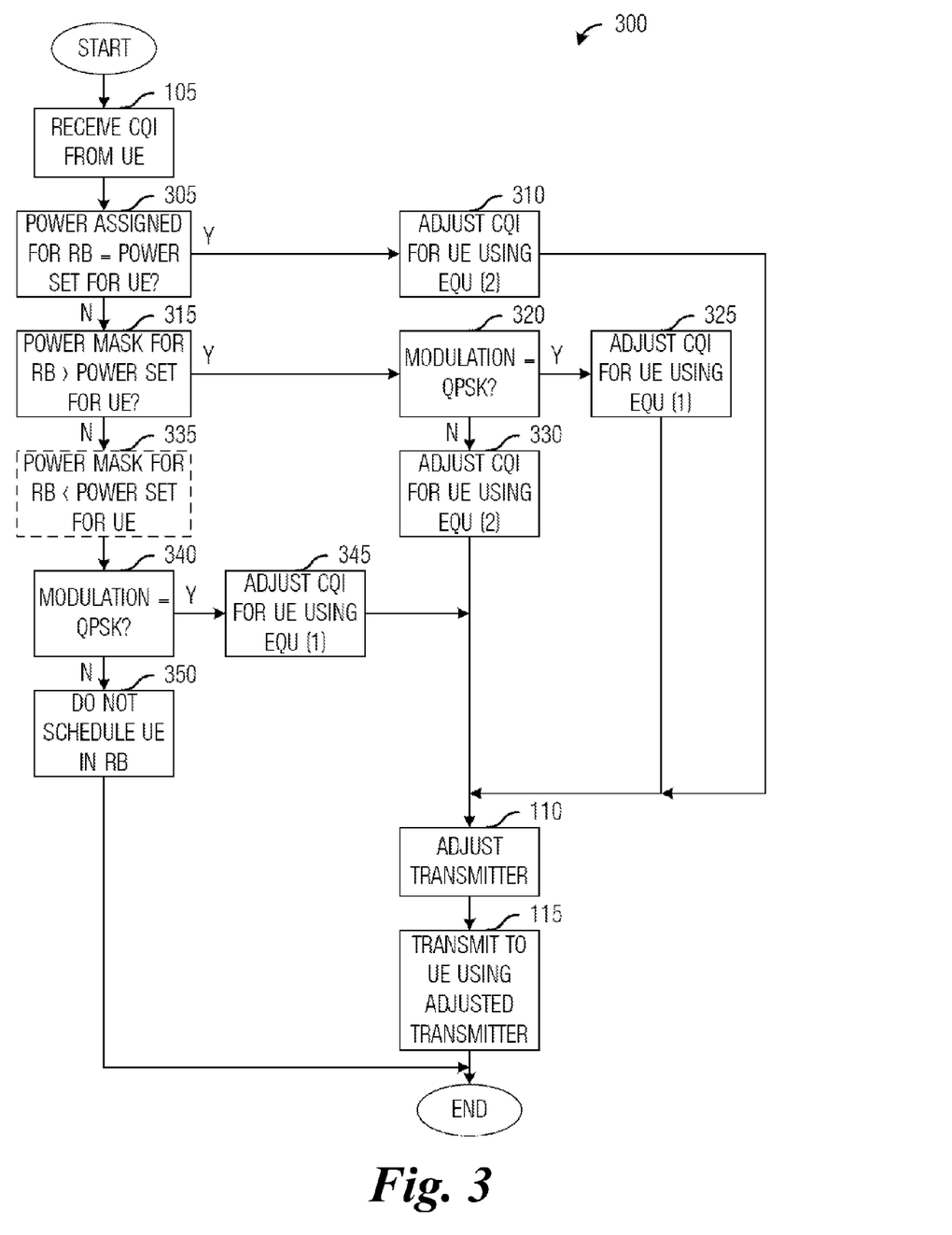
FIG. 3 illustrates a flow diagram according to a further embodiment.

FIG. 3 illustrates a flow diagram of embodiment eNB method 300 that makes use of reported CQI. In an embodiment, eNB method 300 is performed in an eNB as the eNB receives CQI reports from UEs and uses the reported CQI to schedule transmissions to the UEs. In some embodiments, eNB method 300 is performed periodically, such as prior to an eNB DL frame. Alternatively, eNB method 300 can be performed at other times, for example, whenever the eNB receives CQI reports from UEs.

In an embodiment, frequency selective scheduling is used during eNB method 300. Alternatively, similar derivations are also valid for embodiments that use frequency diversity scheduling. Furthermore, assume that the UE is set for one of several power regions. Here, the UE measures an average interference plus noise over all RBs and calculates a CQI for each resource block or a group of resource blocks referred to as resource block group (RBG) based on the received serving signal power on that particular RBG divided by the average interference plus noise. In some embodiments, it is implicitly assumed that the power remains substantially constant over a RB.

In an embodiment, eNB method 300 begins with the eNB receiving CQI reports from UEs that it is serving (block 105). Then, for each RB and each UE, the eNB determines if the power assigned for the RB is the same as the power set for the UE, i.e., $P_s(RB)=P_s(UE)$, where $P_S(RB)$ is the nominal power mask for the RB and $P_s(UE)$ is the power the UE expects to receive data from the eNB (block 305). If the power assigned for the RB is the same as the power set for the UE, then the eNB adjusts the CQI from the UE for interference, using, for example equation (2) (block 310). In an embodiment, the adjusted CQI is used for proportionally fair (PF) scheduling and MCS selection.

If the power assigned for the RB is not the same as the power set for the UE (block 305), then the eNB determines if the power mask for the RB is higher than the power assigned to the UE, i.e., $P_s(RB)>P_s(UE)$ (block 315). If the power mask for the RB is higher than the power assigned to the UE, then the eNB determines if QPSK modulation is assigned to the UE (block 320). As discussed previously, a user may be deemed a QPSK user if it is using QPSK (or another form of PSK) with rank one (1), or QPSK (or another form of PSK) with rank greater than one (1) if SIC is not used. If QPSK modulation is assigned to the UE, then the CQI is adjusted based on both signal power adjustments and interference adjustments, such as shown in equation (1) (block 325). In this case, if the UE is scheduled in a zone with higher power than that which is assigned the power region, the UE may receive data at a higher power than it expects. If QPSK modulation is not assigned to UE, then the CQI is adjusted based on interference, such as shown in equation (2) (block 330). In this case, if the UE is scheduled in the power region, the UE receives data with the same power as it expects, which is lower than the eNB power mask.

In an embodiment, if the power mask for the RB is not higher than the power assigned to the UE, then the power mask for the RB is lower than the power assigned to the UE, i.e., $P_s(RB)<P_s(UE)$ (block 335) and the eNB performs another check to determine if QPSK modulation is assigned to the UE (block 340). Again, as discussed previously, a user may be deemed a QPSK user if it is using QPSK (or another form of PSK) with rank one (1), or QPSK (or another form of PSK) with rank greater than one (1) if SIC is not used. If QPSK modulation is assigned to the UE, then the CQI may be adjusted based on both signal power adjustments and interference adjustments, such as shown in equation (1) (block 345). If the UE is scheduled in a power zone with lower power than that which is assigned the power region, the UE may receive data at a lower power than it expects. If QPSK modulation is not assigned to UE, then the UE is scheduled in the RB (block 350).

In an embodiment, the adjusted CQI is used to adjust the eNB's transmitter (block 110). The adjusted transmitter is then used to transmit to the UE at the RB with the set power level (block 115).

In some embodiments, outer loop initial block error rate (IBLER) adjustment based on received ACKs and NACKs received from the UEs may be applied on top of inter cell interference coordination (ICIC) CQI adjustment to fine tune scheduling and MCS selection. Scheduling can be performed using PF and/or other types of schedulers.

In some embodiments, some UEs may not report RSRP for their neighboring eNBs. For these UEs, the eNB estimates the neighbor eNB's list based on cell topology and adjusts the CQI based on an estimated list.

In an embodiment, for QPSK UEs, the assigned power may be any value that does not exceed the power spectrum mask. However, this may result in under-utilization of a power amplifier (of the transmitter) at the serving eNB.

In some embodiments, the CQI adjustments discussed above may result in a large CQI interference adjustment value if a power difference between high power and low power regions is very large. In an embodiment, the eNB limits the CQI interference adjustment to a set maximum value, for example, ±3 dB. The actual dominant interferer for each RB may not necessarily be within the reported neighbor list. This may be because RSRP only captures long-term fading. Additionally, in some embodiments, the adjustment is based on limited neighbor cell RSRP reports.

Figure 4:
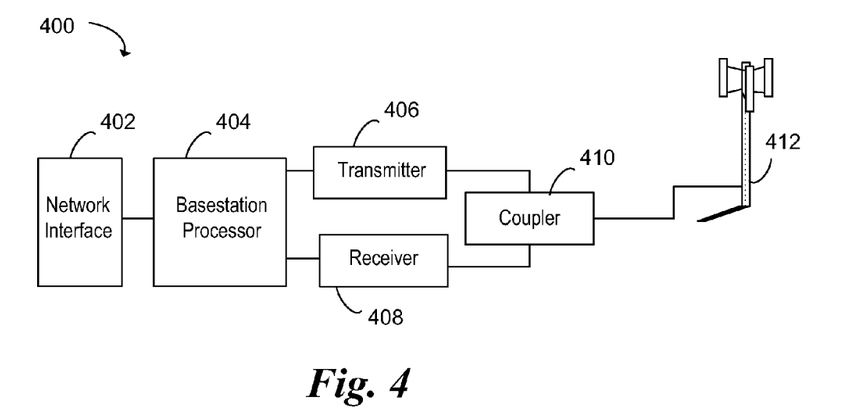
FIG. 4 illustrates a block diagram of an embodiment base station.

A block diagram of an embodiment base station 400 is illustrated in FIG. 4. Base station 400 has a base station processor 404 coupled to transmitter 406 and receiver 408, and network interface 402. Transmitter 406 and receiver 408 are coupled to antenna 412 via coupler 410. Base station processor 404 executes embodiment downlink channel quality index adjustment algorithms. In some embodiments of the present invention, base station 400 is configured to operate in a LTE network using an OFDMA downlink channel divided into multiple subbands and using single carrier FDMA in the uplink. In alternative embodiments, other systems, network types and transmission schemes can be used, for example, Wimax, and 1XEV-DO and IEEE 802.16m.

Figure 5:
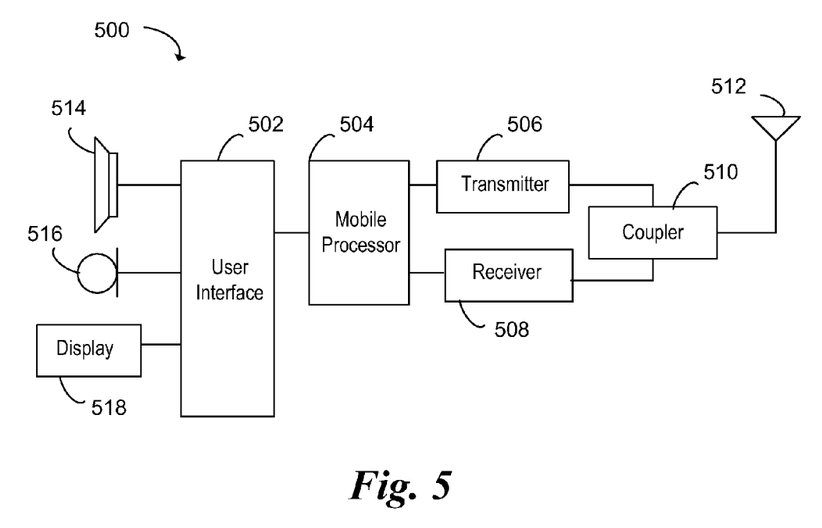
FIG. 5 illustrates a block diagram of an embodiment user device.

A block diagram of an embodiment user device 500 is illustrated in FIG. 5. User device 500 can be implemented, for example, as a cellular telephone, or other mobile communication device, such as a computer or network enabled peripheral. Alternatively, user device 500 can be a non-mobile device, such as a desktop computer with wireless network connectivity. User device 500 has mobile processor 504, transmitter 506 and receiver 508, which are coupled to antenna 512 via coupler 510. User interface 502 is coupled to mobile processor 504 and provides interfaces to loudspeaker 514, microphone 516 and display 518, for example. In an embodiment, processor 504 determines the CQI. Alternatively, user device 500 may have a different configuration with respect to user interface 502, or user interface 502 may be omitted entirely. In an embodiment, user device 500 is a UE operating on a LTE network. In alternative embodiments, user device 500 is configured to operate on other types of networks.

In an embodiment, a method for adjusting channel feedback information by a controller includes receiving the channel feedback information from a communications node, adjusting the channel feedback information based on a measurement of interference from neighboring controllers, adjusting transmit parameters of the controller using the adjusted channel feedback information, and transmitting to the communications node using the adjusted transmit parameters. In an embodiment, the method includes obtaining information of a transmit power mask and channel resource utilization of the neighboring controllers that cause interference to cell edge users. In an embodiment, the channel feedback information includes a channel quality index.

In an embodiment obtaining information includes exchanging information with the neighboring controllers. In a further embodiment, the method includes adjusting the channel feedback information based on subband channel quality index (CQI) feedback from the communications node.

In one embodiment, measurement of interference from neighboring controllers is a measure of path-loss from the neighboring controllers. In a further embodiment, the measure of path-loss from the neighboring controllers includes measurements of a received power of reference sequences transmitted by the neighboring controllers. In some embodiments, the measure of path-loss from the neighboring controllers is measured over an extended period of time. In a further embodiment, the extended period includes a number of transmission frames.

In an embodiment, the measurement of interference from neighboring controllers includes estimating a path-loss from the neighboring controllers. In some embodiments, estimating the path-loss is based on a topology of the controller and the neighboring controllers.

In an embodiment, adjusting the channel feedback information includes comparing a power assigned for a resource block with a power assigned for the communications device, and adjusting the channel feedback information based on a result of the comparing. In an embodiment, the power assigned for the resource block and the power assigned for the communications device are substantially equal. Here, adjusting the channel feedback information based on a result of the comparing includes adjusting the channel feedback information due to interference.

In a further embodiment, adjusting the channel feedback information due to interference is expressible as:

$$CQI_{adj\_nonQPSK} = \frac{1}{\text{Interf\_Adj}} CQI_{feedback}$$
$$= \frac{1}{Interf_{FFR}(RB)/Interf_{noFFR}} CQI_{feedback},$$

where $CQI_{feedback}$ is the channel feedback information, Interf_Adj is the adjustment due to interference, $Interf_{FFR}(RB)$ is the wideband interference at the resource block when fractional frequency reuse is used, and $Interf_{noFFR}$ is the wideband interference when fractional frequency reuse is not used.

In a further embodiment, the power assigned for the resource block and the power assigned for the communications device are not equal. Here, adjusting the channel feedback information based on a result of the comparing includes adjusting the channel feedback information due to interference and signal power adjustments. In an embodiment, the power assigned for the resource block is greater than the power assigned for the communications device. Adjusting the channel feedback information due to interference and signal power adjustments includes, in response to determining that quadrature phase-shift keying is used at the communications device, adjusting the channel feedback information due to both interference and signal power adjustments, and in response to determining that quadrature phase-shift keying is not used at the communications device, adjusting the channel feedback information due to interference In an embodiment, adjusting the channel feedback information due to both interference and signal power adjustments is expressible as:

$$CQI_{adj\_QPSK} = \frac{\text{Signal\_Adj}}{\text{Interf\_Adj}} CQI_{feedback}$$
$$= \frac{P_s(RB)/P_s(UE)}{Interf_{FFR}(RB)/Interf_{noFFR}} CQI_{feedback},$$

where $CQI_{feedback}$ is the channel feedback information, Signal_Adj is the adjustment due to signal power adjustments, Interf_Adj is the adjustment due to interference, $P_s(RB)$ is the power assigned to the resource block, $P_s(UE)$ is the power assigned to the communications device, $Interf_{FFR}(RB)$ is the wideband interference at the resource block when fractional frequency reuse is used, and $Interf_{noFFR}$ is the wideband interference when fractional frequency reuse is not used.

In an embodiment, the power assigned for the resource block is less than the power assigned for the communications device. Here, adjusting the channel feedback information due to interference and signal power adjustments includes in response to determining that quadrature phase-shift keying is used at the communications device, adjusting the channel feedback information due to both interference and signal power adjustments. In response to determining that quadrature phase-shift keying is not used at the communications device, no adjustments are made to the channel feedback information.

In a further embodiment, making no adjustments to the channel feedback information further comprises removing the communications device from a list of communications device to schedule transmissions.

Although the embodiments and their advantages have been described in detail, it should be understood that various changes, substitutions and alterations could be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a base station, the method comprising:
    receiving channel feedback information from a communications device;
    determining an interference adjustment factor according to $$CQI_{adj\_nonQPSK} = \frac{1}{\text{Interf\_Adj}} CQI_{feedback}$$

$$= \frac{1}{Interf_{FFR}(RB)/Interf_{noFFR}} CQI_{feedback},$$

where $CQI_{feedback}$ is the channel feedback information, Interf_Adj is the interference adjustment factor, $Interf_{FFR}(RB)$ is wideband interference at the resource block when fractional frequency reuse is used, and $Interf_{noFFR}$ is wideband interference when fractional frequency reuse is not used;
    adjusting the channel feedback information in accordance with the interference adjustment factor; and
    adjusting transmission parameters of the base station using the adjusted channel feedback information.

2. The method of claim 1, wherein the CQI comprises a channel quality index.

3. The method of claim 1, wherein obtaining the path-loss information comprises receiving reference sequence received power (RSRP) information from the communications node, the RSRP information corresponding to measurements taken by the communications node of reference sequences transmitted by the one or more neighboring controllers.

4. The method of claim 3, wherein obtaining the path-loss information comprises averaging multiple RSRP reports received from the communications node over a period of time.

5. The method of claim 3, wherein the reference sequences are carried in downlink transmission frames sent by the one or more neighboring controllers.

6. The method of claim 1, wherein obtaining the path-loss information comprises estimating a path-loss for each of the interference channels.

7. The method of claim 6, wherein estimating the path-loss for each of the interference channels comprises estimating the path-loss in accordance with a cell topology of the controller and the one or more neighboring controllers.

8. The method of claim 1, wherein adjusting the channel feedback information comprises:
    adjusting the channel feedback information according to the interference adjustment factor when a difference between the power assigned for the resource block and the power assigned for the communications device is less than a threshold; and
    adjusting the channel feedback information according to the interference adjustment factor and a signal power adjustment factor when the difference between the power assigned for the resource block and the power assigned for the communications device exceeds a threshold.

9. The method of claim 1, further comprising:
    determining whether phase-shift keying is used by the communications device;
    adjusting the channel feedback information according to the interference adjustment factor and a signal power adjustment factor when phase-shift keying is used by the communications device; and
    adjusting the channel feedback information according to the interference adjustment factor when phase-shift keying is not used by the communications device and the power assigned for the resource block is greater than the power assigned for the communications device.

10. The method of claim 9, further comprising foregoing scheduling the resource block to the communications device when phase-shift keying is not used by the communications device and the power assigned for the resource block is less than the power assigned for the communications device.

11. The method of claim 10, wherein foregoing scheduling the resource block comprises removing the communications device from a list of communication devices to be allocated resources for downlink transmissions.

12. The method of claim 9, wherein adjusting the channel feedback information according to the interference adjustment factor comprises determining a value for $CQI_{adj\_nonQPSK}$ according to:

$$CQI_{adj\_nonQPSK} = \frac{1}{\text{Interf\_Adj}} CQI_{feedback}$$

$$= \frac{1}{Interf_{FFR}(RB)/Interf_{noFFR}} CQI_{feedback},$$

and
    wherein adjusting the channel feedback information according to the interference adjustment factor and the signal power adjustment factor comprises determining a value for $CQI_{adj\_QPSK}$ according to:

$$CQI_{adj\_QPSK} = \frac{\text{Signal\_Adj}}{\text{Interf\_Adj}} CQI_{feedback}$$

$$= \frac{P_s(RB)/P_s(UE)}{Interf_{FFR}(RB)/Interf_{noFFR}} CQI_{feedback},$$

where $CQI_{feedback}$ is the channel feedback information, Signal_Adj is the signal power adjustment factor, $P_s(RB)$ is the power assigned to the resource block, $P_s(UE)$ is the power assigned to the communications device, Interf_Adj is the interference adjustment factor, $Interf_{FFR}(RB)$ is wideband interference at the resource block when fractional frequency reuse is used, and $Interf_{noFFR}$ is wideband interference when fractional frequency reuse is not used.

13. A method of operating a base station, the method comprising:

receiving channel feedback information from a communications device;

determining an interference adjustment factor according to:

$$CQI_{adj\_QPSK} = \frac{\text{Signal\_Adj}}{\text{Interf\_Adj}} CQI_{feedback}$$

$$= \frac{P_s(RB)/P_s(UE)}{Interf_{FFR}(RB)/Interf_{noFFR}} CQI_{feedback},$$

where $CQI_{feedback}$ is the channel feedback information, Signal_Adj is the signal power adjustment factor, Interf_Adj is the interference adjustment factor, $P_s(RB)$ is the power assigned to the resource block, $P_s(UE)$ is the power assigned to the communications device, $Interf_{FFR}(RB)$ is wideband interference at the resource block when fractional frequency reuse is used, and $Interf_{noFFR}$ is wideband interference when fractional frequency reuse is not used;

adjusting the channel feedback information in accordance with the interference adjustment factor; and adjusting transmission parameters of the base station using the adjusted channel feedback information.

* * * * *